United States Patent [19]
Nishimura et al.

[11] Patent Number: 5,754,221
[45] Date of Patent: May 19, 1998

[54] FILM IMAGE INPUT METHOD AND SYSTEM THEREOF

[75] Inventors: Toru Nishimura; Atsushi Itoh, both of Asaka, Japan

[73] Assignee: Fuji Photo Film Co., Ltd., Kanagawa, Japan

[21] Appl. No.: 847,242

[22] Filed: May 1, 1997

Related U.S. Application Data

[63] Continuation of Ser. No. 360,433, Dec. 21, 1994, abandoned.

[30] Foreign Application Priority Data

Dec. 23, 1993  [JP]  Japan ................... 5-327194

[51] Int. Cl.⁶ ............................................. H04N 3/36
[52] U.S. Cl. ................................... 348/97; 358/452
[58] Field of Search .................... 348/97, 98, 99, 348/100, 101, 102, 104, 105, 107, 110, 108, 111, 362, 363; 358/452, 448, 450, 451, 516, 515, 518, 474, 195

[56] References Cited

U.S. PATENT DOCUMENTS

| | | |
|---|---|---|
| 5,060,061 | 10/1991 | Shishido et al. ............... 348/104 |
| 5,309,242 | 5/1994 | Asami et al. . |
| 5,389,966 | 2/1995 | Ikari et al. . |
| 5,448,377 | 9/1995 | Kinoshita et al. ............ 358/452 |

FOREIGN PATENT DOCUMENTS

| | | |
|---|---|---|
| 5-22656 | 1/1993 | Japan . |
| 5-56345 | 3/1993 | Japan . |
| 5-75922 | 3/1993 | Japan . |
| WO 9004301 | 4/1990 | WIPO . |

*Primary Examiner*—Amelia Au

[57] ABSTRACT

A film image input method and device uses a line sensor as an image sensor to reduce the cost, and the image data can be corrected in accordance with the taking environment, which occurs in a case of using the line sensor, for every frame. The line sensor includes photoelectric transfer elements arranged in a direction perpendicular to a feeding direction of a long roll of developed film for a still camera. The film is fed at a first speed continuously to take the rough image data of all frames through the line sensor, and the taking environment for every frame is detected based on the taken rough image data. Thereafter, when reproducing one frame, the film is fed at the second speed, whereby the fine image data of the desired frame are adjusted in accordance with the detected taking environment of the frame and stored in the CCD buffer, and then the image signals are output to the TV monitor based on the stored fine image data.

16 Claims, 15 Drawing Sheets

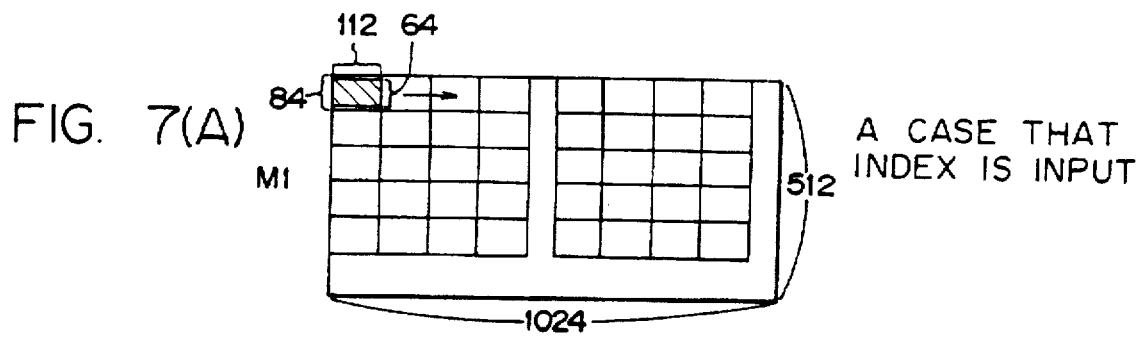
FIG. 7(A) A CASE THAT INDEX IS INPUT
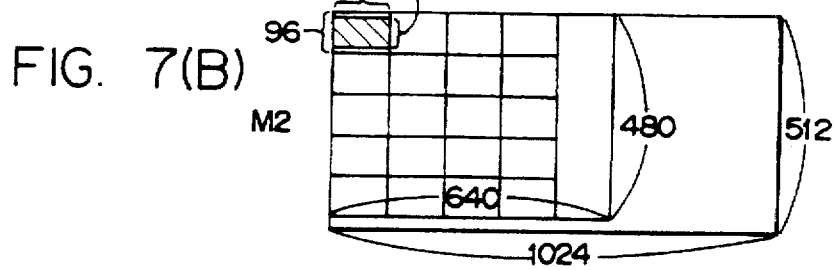
FIG. 7(B) ENLARGE TRANSFER
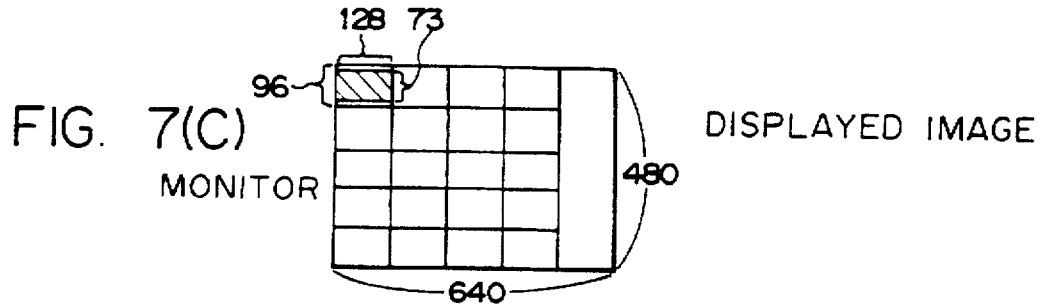
FIG. 7(C) DISPLAYED IMAGE
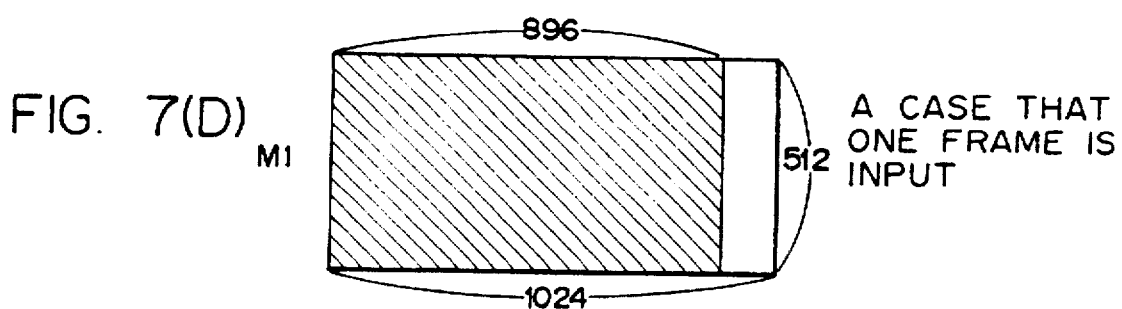
FIG. 7(D) A CASE THAT ONE FRAME IS INPUT

FIG. 8(A)

NORMAL CAMERA

| 1 | 2 | 3 | 4 |
|---|---|---|---|
| 5 | 6 | • |   |
|   |   |   |   |
|   |   |   |   |
|   |   |   |   |

FIG. 8(B)

| 5  | 6  | 7  | 8  |
|----|----|----|----|
| 9  | 10 | 11 | 12 |
| 13 | 14 | 15 | 16 |
| 17 | 18 | 19 | 20 |
| 21 | •  |    |    |

FIG. 8(C)

PRE-WIND TYPE CAMERA

|    |    |    |    |
|----|----|----|----|
|    |    |    |    |
|    |    |    |    |
|    | •  | 35 | 36 |
| 37 | 38 | 39 | 40 |

FIG. 8(D)

|    | •  | 19 | 20 |
|----|----|----|----|
| 21 | 22 | 23 | 24 |
| 25 | 26 | 27 | 28 |
| 29 | 30 | 31 | 32 |
| 33 | 34 | 35 | 36 |

| 1 SKIP | 2 | 3 | 4 | P S E T |
| 5 | 6 | 7 | 8 | R O T S |
| 9 | 10 | 11 | 12 | SKPS |
| 13 | 14 | 15 | 16 | V I E W |
| 17 | 18 | 19 | 20 | P L A Y |
| | | | | E N V |
| | | | | E N D |

SKIP
↑
| UP. DOWN
↓
VIEW

| | 1 ↑ ↑ | 2 | 3 | 4 | P S E T |
|---|---|---|---|---|---|
| | 5 | 6 | 7 | 8 | R O T S |
| | 9 | 10 | 11 | 12 | S K P S |
| | 13 | 14 | 15 | 16 | V I E W |
| | 17 | 18 | 19 | 20 | P L A Y |
| | | | | | E N V |
| | | | | | E N D |

FIG. 11

| | | | | |
|---|---|---|---|---|
| 1 3 | 2 | 3 ○ | 4 | P S E T |
| 5 | 6 | 7 | 8 | R O T S |
| 9 | 10 | 11 | 12 | S K P S |
| 13 | 14 | 15 | 16 | V I E W |
| 17 | 18 | 19 | 20 | P L A Y |
| | | | | E N V |
| | | | | E N D |

DATE

ON
↑
UP
DOWN  ↕
↓
OFF

PLAY

VIEW
↑
UP
DOWN  ↕
↓
SKIP

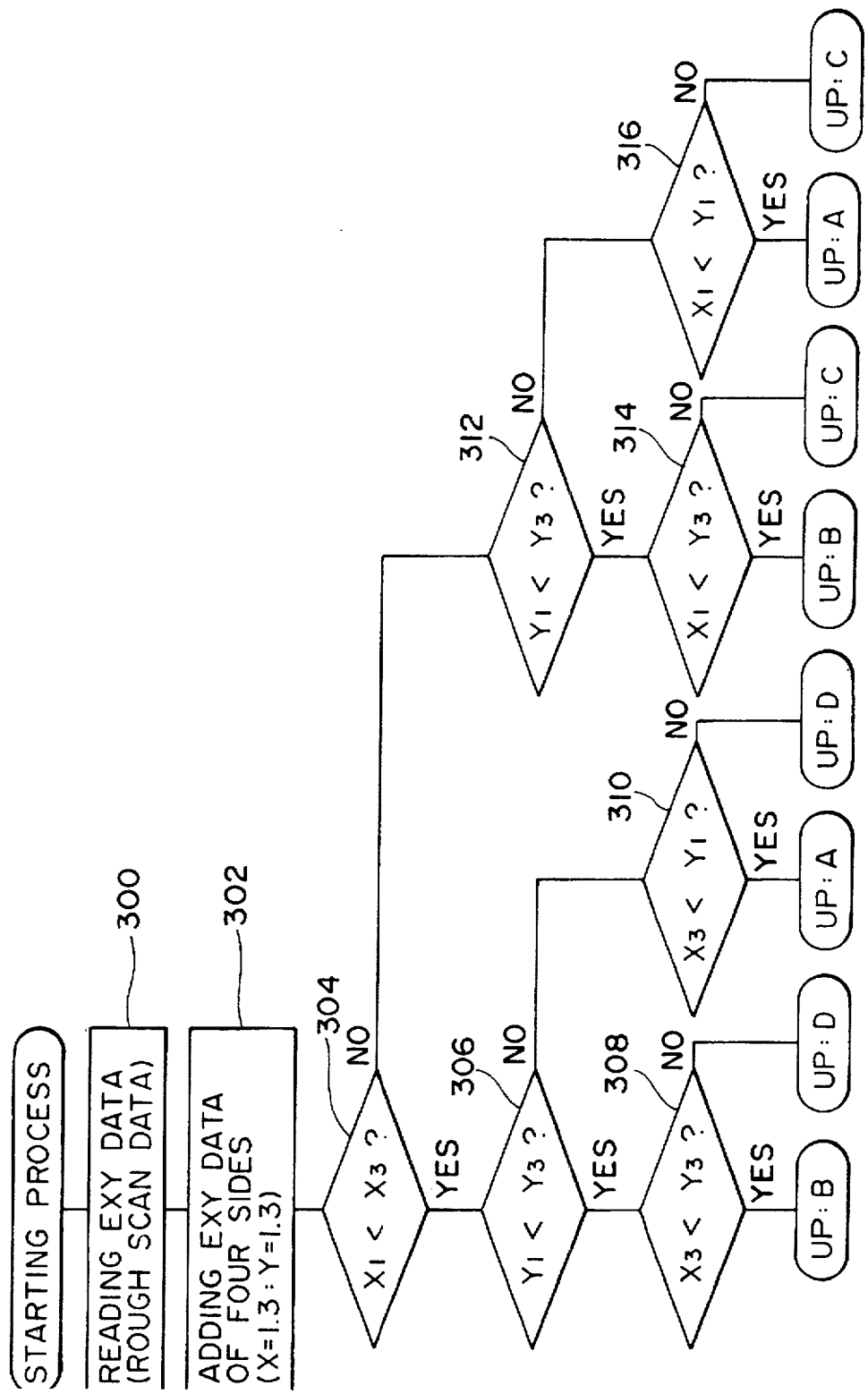

FILM IMAGE INPUT METHOD AND SYSTEM THEREOF

This application is a continuation of application Ser. No. 08/360,433 filed on Dec. 21, 1994, now abandoned.

BACKGROUND OF THE INVENTION

1. Field of the Invention

The present invention relates to a film image input method and a system thereof, more particularly to a film image input method and a system thereof wherein an image of a developed film for a still camera is focused on an image sensor through a taking lens and image signals, which are transferred photoelectrically by the image sensor, are output on a TV monitor, whereby the image of the film is replayed on the TV monitor.

2. Description of the Related Art

Conventionally, a film image input system wherein a developed film for a still camera is focused by an image sensor such as a CCD and an image of the film is transferred into image signals, thereafter, the image signals are output to the TV monitor and the image of the film is displayed, is disclosed in WO90/04301, Japan Patent Application Laid-Open No. 5-75922, Japan Patent Application Laid-Open No. 5-56345, Japan Patent Application Laid-Open No. 5-22656 and the like.

WO90/04301 discloses a camera and film image input system which use a photo film provided with a magnetic recording track and Japan Patent Application Laid-Open No. 5-75922 discloses a film image input system which uses a film cartridge wherein a developed film for a still camera is wound around a single spool.

Japan Patent Application Laid-Open No. 5-22656 discloses a film image input system wherein when an instruction is given to make a multi picture (hereinunder, called an index image), a developed film for a still camera is wound or re-wound every one frame and the image date of every frame is taken through the image sensor and compressed to memorize in an image memory for one picture the index image is displayed on the TV monitor based on the image data memorized in the image memory.

Further, there .IIs another conventional film image input system provided with a zoom lens and scan mechanism for taking out only necessary image range within one frame of the film to magnify (for trimming), an image sensor rotating mechanism for changing the length and breadth of the film image or the like.

In a conventional film image input system, when the image displayed on the TV monitor is edited (for example, the length and breadth of the image is changed, a format such as a high-vision size, a panoramic size and an ordinary size corresponding to the ratio of the length to the breadth of the image is specified, or the display/non-display frame is specified in case of displaying all frames in sequence), the image for one frame is displayed on the TV monitor thereby to edit the image while monitoring.

Then, in the conventional film image input systems, a two-dimensional image sensor is used as an image sensor, so that the brightness, the white balance and the like which vary with the taking environment can be corrected at real time to obtain the image data. However, there is a problem in that a two-dimensional image sensor is more expensive than a one-dimensional sensor (a line sensor).

When the image data for one frame of the photo film which is fed continuously is taken with the line sensor and the still picture is displayed on the TV monitor based on the image data, there is another problem in that a fine image data of which the brightness, the white balance and the like have been corrected can not obtained though the image data for one frame is taken once, since the image data can not be obtained at real time like a two-dimensional image sensor.

Further, in the conventional film image input systems, when the image displayed on TV monitor is edited, the image for one frame is displayed on the TV monitor and then the image is edited while monitoring. Thus, there are other problems in that all frames photographed in the film can not be story-edited easily and effectively because a plurality of frames are not displayed on the TV monitor at the same time.

Japan Patent Application Laid-Open No. 5-22656 gives a description of that in which an index image is produced and displayed. However, the index image is used for selecting a desired frame to be displayed on the TV monitor, not for editing.

Incidentally, the above-described index image can be used for editing, however, the conventional film image input system uses a two-dimensional image sensor. Thus, to produce the index image, the film must be wound or rewound one frame at a time and the image data for every frame must be taken by the image sensor during stopping of the film, whereby much time is taken for taking in the image data of all frames in one film.

SUMMARY OF THE INVENTION

The present invention has been developed to eliminate the above-described problems and has as its aim the provision of a film image input method and a system thereof wherein a line sensor is used as an image sensor to reduce cost, and the correction of the image data, which becomes necessary when a line sensor is used, can be done quickly in accordance with the taking environment for every frame.

Further, the present invention has as its aim the provision of a film image input method and a system thereof wherein an index image can be made in a short time, and continuous images can be edited easily while monitoring the index image.

To achieve the above-described object, a film image input method includes: providing a line sensor in which photoelectric transfer elements are arranged in a direction perpendicular to a feeding direction of a long roll of developed film for a still camera; taking rough image data of all frames through said line sensor by feeding said film continuously at a first speed; detecting taking environment of every frame based on said rough image data which are taken; thereafter, adjusting fine image data of a desired frame based on said taking environment of the frame which is detected and taking them through said line sensor by feeding said film at a second speed which is lower than the first speed while reproducing one frame; and, outputting image signals on a TV monitor based on the fine image data which are taken.

Moreover, a film image input method includes: reading magnetic data from a magnetic recording layer of the film during feeding the film continuously and reproducing a film image based on the read magnetic data.

Further, a film image input method includes: displaying index images on a TV monitor by outputting image signals showing index images of plural frames on a TV monitor based on said image data of all frames which are taken; setting a display method and the like with monitoring an index image displayed on the TV monitor and storing set data showing a setting thereof; thereafter, outputting image signals which are processed in accordance with setting data of a frame during reproducing based on the image data of a desired frame.

According to this invention, a line sensor is used instead of an expensive two-dimensional image sensor and a developed film is fed at a constant speed, whereby an image data is taken through the line sensor. Before taking in the desired image data, a rough image data of all frames is taken by feeding the film at the first speed continuously and the taking environment such as a brightness of every frame and a white balance are detected based on the taken image data.

When one frame is reproduced, the film is fed at the second speed which is slower than the first speed. Then, a fine image data of the desired frame is taken through the line sensor while the exposure, the white balance and the like are adjusted in accordance with the detected taking environment of the frame.

While reproducing the magnetic record, it is required that the relative speed between the magnetic head and the record medium is higher than a specific speed, and the magnetic data is read from the magnetic record layer or the magnetic data is written into the magnetic record layer when the film is fed continuously at the high first speed.

Further, index images are made based on the pre-taken image data of all frames by feeding the film continuously, and the image signals showing the index images are output to the TV monitor, whereby the index images are displayed on the TV monitor. Then, the display method of every frame and the like are set while monitoring the index images displayed on the TV monitor, and the setting data is memorized, whereby the respective frames are edited at a time. Thereafter, when one frame is reproduced based on the image data of the desired frame, the setting data of the frame edited as above-mentioned is read and the image signals which are processed in accordance with the setting data are output to the TV monitor.

BRIEF DESCRIPTION OF THE DRAWINGS

The exact nature of this invention, as well as other aims and advantages thereof, will be readily apparent from consideration of the following specification relating to the accompanied drawings, in which like reference characters designate the same or similar parts throughout the figures thereof and wherein:

FIG. 7(A) is a view showing a memory area in a CCD buffer, FIG. 7(B) is a view showing a memory area in a display buffer, FIG. 7(C) is a view showing a image displayed on the TV monitor and FIG. 7(D) is a view showing a memory area of one frame in a CCD buffer of the film image input system shown in FIG. 1;

FIGS. 8(A) and 8(B) are views explaining the process of the index images of the film taken by a normal camera and FIGS. 8(C) and 8(D) are views explaining the process of the index images of the film taken by a pre-wind type camera;

FIG. 11 is a view explaining the setting of the print number for every frame with the index images;

DESCRIPTION OF THE PREFERRED EMBODIMENT

A detailed description will hereafter be given of the preferred embodiment of film image input method and system thereof according to the present invention with reference to the accompanying drawings.

Figure 1:
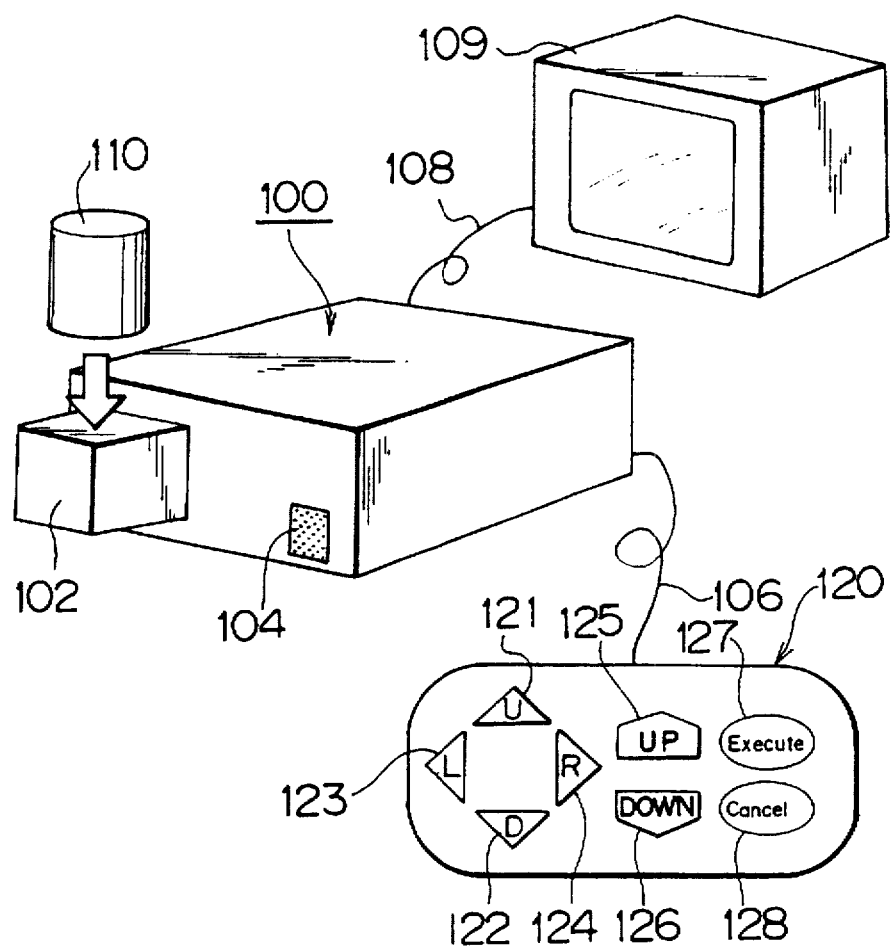
FIG. 1 is a perspective view showing the schematic structure of a whole system including a film image input system according to the present invention.

FIG. 1 is a perspective view showing the schematic structure of a whole system including a film image input system according to this invention. As shown in FIG. 1, a film image input system 100 is shaped in a rectangular parallelepiped, and a film cartridge tray 102 and a power switch 104 are provided at the front thereof. The film cartridge tray 102 is driven back and forth during the loading/unloading of a film cartridge 110, whereby the film cartridge 110 can be stored or taken out.

A key pad 120 and a TV monitor 109 are connected to the film image input system 100, and various control signals, which control the film image input system 100, are output from the key pad 120 to the film image input system 100 through a signal cable 106 and video signals are output from the film image input system 100 to the TV monitor 109 through a signal cable 108. A detailed description will be given later of the film image input system 100 which is controlled by the key pad 120. Further, in this embodiment, the control signals are output from the key pad 120 through the signal cable 106, however, it is not limited to this only, but an infrared remote-control transmitter and receiver may be provided on the key pad 120 and the film image input system 100, respectively, and the control signals from the key pad 120, which are remote-control signals, may be transmitted to the film image input system 100.

Figure 2:
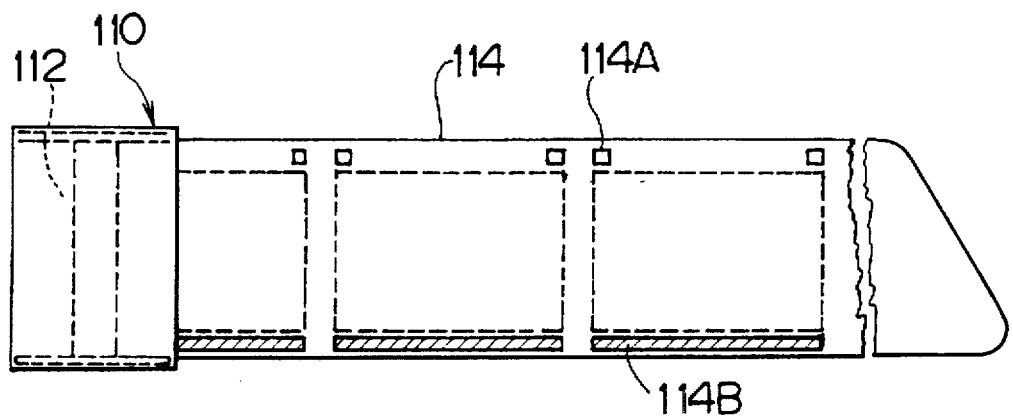
FIG. 2 is a view showing an example of a film cartridge employed in the film image input system shown in FIG. 1.

The film cartridge 110 has a spool 112, as shown in FIG. 2, and a film 114 is wound around the spool 112. In the film 114, perforation 114A, which indicates a frame position, is projected and a magnetic recording layer 114B, on which magnetic data showing photographing data of every frame can be recorded by a camera having a magnetic head, is placed on the whole or at the edge of the film. Further, the developed film 114 is wound in the film cartridge 110 to thereby be kept.

In a camera applied to the film cartridge 110, various magnetic data for every frame can be recorded on the magnetic recording layer 114B of the film 114 by using the magnetic head which is built into the camera. Magnetic data to be recorded include a frame number, a print format indicating a high-vision image, a panoramic image or an ordinary size image, a photographed day/time, a normal-wind/a pre-wind indicating the film wind direction during the photographing with the camera and the like, and further, various data can be recorded in accordance with a camera. Moreover, a bar code indicating a film type, a frame number and the like can be recorded optically on the outside of the frame which is exposed by the object light and data indicating a print format and the like can be recorded optically on the outside of the frame by the light source built into the camera during the photographing.

Figure 3:
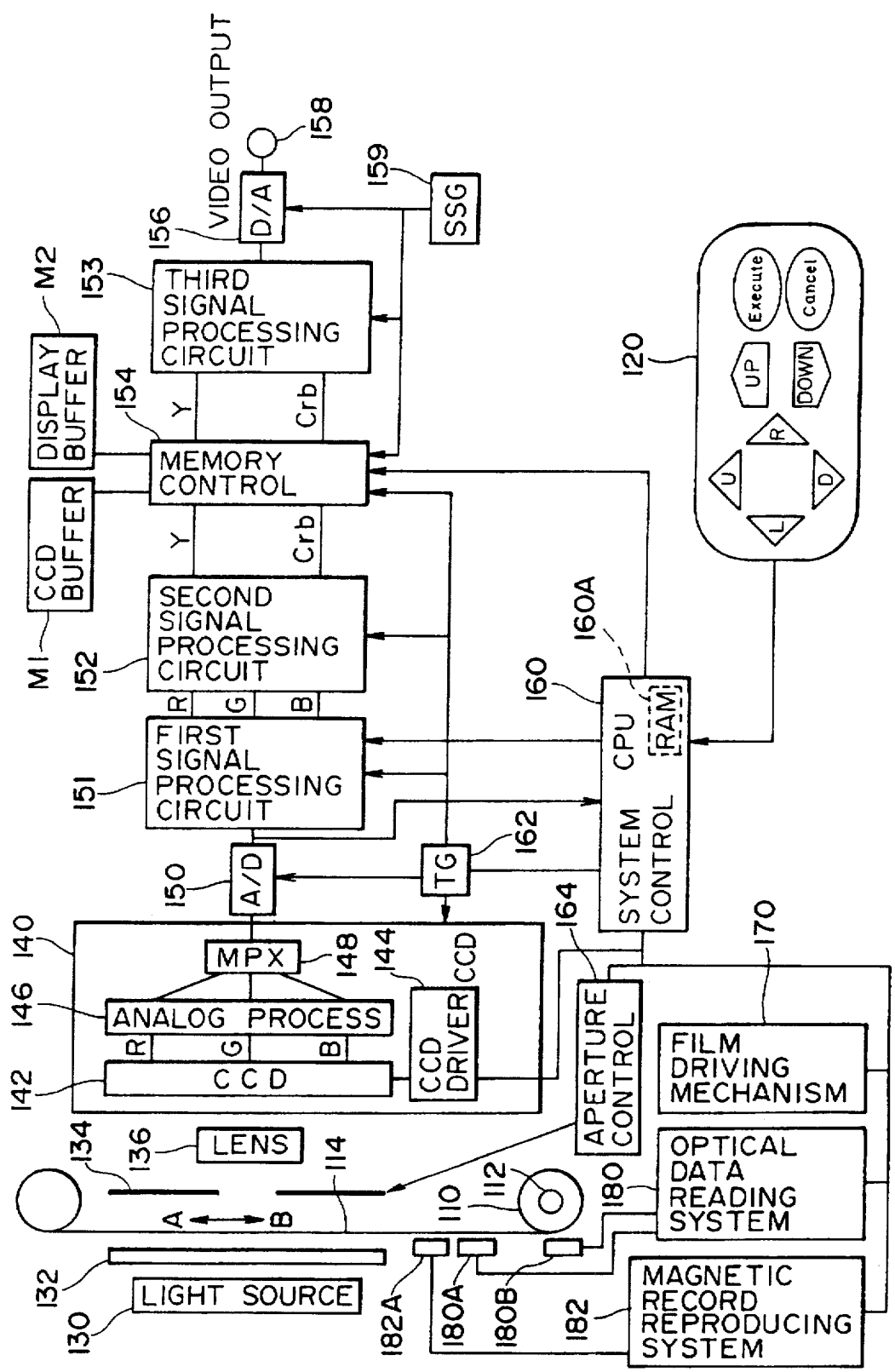
FIG. 3 is a block diagram showing an example of an internal structure of the film image input system shown in FIG. 1.

FIG. 3 is a block diagram showing an embodiment of the internal structure of the film image input system 100. The film image input system 100 comprises a light source 130 for lighting, a taking lens 136, a CCD circuit unit 140 including a CCD line sensor 140, a first signal processing circuit 151, a second signal processing circuit 152, a third signal processing circuit 153, a memory control circuit 154, a CCD buffer M1, a display buffer M2, a central processing unit (CPU) 160, a film driving mechanism 170, an optical data reading system 180, a magnetic record reproducing system 182 and the like.

The light source 130 consists of, for example, a fluorescent light which is in a longitudinal direction, perpendicular to the feeding direction of the film 114, and illuminates the film 114 through an infrared light cutting filter 132. The image light which permeates through the film 114 is focused on the light receiving surface of the CCD line sensor 142 through the taking lens with a focal point. The film 114 is moved in the direction of the arrow A (hereunder, the sequential direction) or in the direction of the arrow B (hereunder, the reverse direction) by the film driving mechanism 140 when the film image is picked up by the CCD line sensor 142. A detailed description as to the film driving will be given later.

The CCD line sensor 142 is placed in the direction perpendicular to the film feeding direction. The image light focused on the light receiving surface of the CCD line sensor 142 is charged and stored at each sensor which has a R, G or B filter for a predetermined time, and converted to a signal charges of R, G or B in accordance with the intensity of the light. The stored signal charges are read to a shift resistor with a lead gate pulse having a predetermined cycle from the CCD driving circuit 144, and is read by the resistor transmitting pulse, sequentially.

The CCD line sensor 142 has, for example, sensors for 1024 picture elements in the direction perpendicular to the film feeding direction. Further, when the cycle of the lead gate pulse or the like is unchanged, the number of the picture elements in the film feeding direction of one frame varies in accordance with the film feeding speed. In this embodiment, when the film feeding speed is a half, one, eight and sixteen times of the standard speed, the number of the picture elements becomes 1792, 896, 112 and 56, respectively.

With this arrangement, the signal charges which are read from the CCD line sensor 142 is clamped with a CCD clamp, and input to an analog processing circuit 146 as the R, G, B signals and the gain and the like of the R, G, B signals are controlled. The R, G, B signals output from the analog processing circuit 146 are point-sequenced by a multiplexer 148 and converted to digital signals by an A/D converter 150, thereafter, output to the first signal processing circuit 151 and the CPU 160.

The first signal processing circuit 151 includes a white balance adjustment circuit, a negative-positive changing circuit, a γ-correcting circuit, a RGB synchronizing circuit and the like, and processes the point sequenced R, G, B signals, which are input sequentially, in the respective circuits, and then outputs the synchronized R, G, B signals to the second signal processing circuit 152. Further, the white balance adjustment circuit in the first signal processing circuit 151 processes control signals from the CPU 160, a detailed description will be given later.

The second signal processing circuit 152 has a matrix circuit, and produces a luminance signal Y a chromatic signal Cr/b and output them to a memory control circuit 154.

The memory control circuit 154 controls the luminance signal Y and the chromatic signal Cr/b which are written/read to the CCD buffer M1 and the luminance signal Y and the chromatic signal Cr/b, which are memorized in the buffer M1, which are written/read to the display buffer M2. A detailed description will be given of the control to the write/read for the CCD buffer M1 and the display buffer M2, later.

The luminance signal Y and the chromatic signal Cr/b, which are read from the display buffer by the memory control circuit 151, are output to the third signal processing circuit 153. In the third signal processing circuit 153, color combined image signals of a mode such as NTSC mode, are produced, and then output to a video output terminal 158 through the D/A converter 156. Synchronized signals having predetermined cycles are output from a synchronized signal producing circuit 159 to the memory control circuit 154, the third signal processing circuit 156 and the D/A converter 156, respectively, whereby the respective circuits can be synchronized and image signals including required synchronizing signals can be received. Timing signals, which are controlled by the CPU 160, are output to the CCD circuit unit 140, the A/D converter 150, the first signal processing circuit 151, the second signal processing circuit 152 and the memory control circuit 154 from a timing signal producing circuit 162, respectively, whereby the respective circuits are synchronized.

The film driving mechanism 170 is fixed to the spool 112 in the film cartridge 110 and is positioned in a film feeding portion which drives the spool 112 clockwise/counterclockwise, a film winding portion which winds the film 114 from the feeding portion and a film conveying path, and further is composed of a mechanism which feeds the film 114 at a constant speed which can be held by a capstan and a pinchroller. The film feeding portion drives the spool 112 in the film cartridge 110 clockwise in FIG. 3 to thereby feed the film 114 from the film cartridge 110 until the film top is wound by the film winding portion.

The optical data reading system 180 is composed of a first optical sensor 180A for optically detecting the perforation 114A of the film 114 and a second optical sensor 180B for optically detecting optical data such as a bar code written at the edge of the film, and then it processes the optical data which are detected by the optical sensors 180A and 180B and then outputs it to the CPU 160.

In the magnetic record reproducing system 182 which has a magnetic head 182A, the magnetic data recorded on the magnetic recording layer 114B of the film 114, are read through the magnetic head 182A, and then processed and then output to the CPU 160 to be recorded in a RAM 160A. Further, the data, which are recorded in the RAM 160A of the CPU 160 are read and converted to signals to be available for magnetic recording, and then output to the magnetic head 182A and stored in the magnetic recording layer 114B of the film 114.

Next, the operation of the above-mentioned film image input system 100 will be described while referring to the flow chart in FIG. 4.

First, the film cartridge 110 is set in the film cartridge tray 102, and then the film driving mechanism 170 is controlled by the CPU 160 to thereby load the film (step 200). That is, the film 114 is fed from the film cartridge 110 and the film top is to be wound to the winding axis which is the film winding portion.

When the film loading is completed, the first pre-scan of the film 114 is started. That is, as shown in FIG. 5, the film 114 is fed in the right direction (see FIG. 4) at the high speed, 148.0 mm/s, and then rewound in the reverse direction at 148.0 mm/s. When the first pre-scan in the right direction is performed, the image data are taken through the CCD line sensor 142 and the optical data and the magnetic data are read through the optical data reading system and the magnetic record reproducing system 182.

Next, a description is given of the process based on the image data which are taken during the first pre-scan.

The point-sequenced R, G, B signals are input to the CPU 160 from the A/D converter 150 shown in FIG. 3. In the CPU 160, the R, G, B signals of all frames are taken, respectively, off-set values of the respective color signals and gain adjustment values of the respective color signals for adjusting white balances are calculated, and then off-set data showing the off-set values of the respective color signals and AWB data showing the gain values are stored in the RAM 160A in the CPU 160 for every frame. Further, AE data, with which the brightness of every frame is shown by the R, G, B signals, are stored in the RAM 160A. And, the CPU 160 can detect every frame based on the optical/magnetic data, which are input through the optical data reading system 180 and the magnetic record reproducing system 182, and can detect also the frame number by counting frames.

Then, the second pre-scan of the film 114 is performed. This is shown in FIG. 5; the film 114 is fed in the forward direction at the high speed, 74.0 mm/s again, and then rewound in the reverse direction at 148.0 mm/s. When the second pre-scan in the right direction is performed, the image data are taken through the CCD line sensor 142 again. The CPU 160 controls an aperture 134 every frame based on the AE data stored in the RAM 160A through a aperture control system 164 during the taking of the image data. Further, when a sensor having an electric shutter mechanism is used as the CCD line sensor 142, the charge storage time in the CCD line sensor 142 is controlled through the CCD driving circuit 144, whereby exposure values can be adjusted, and as the result, the aperture 134 and the aperture control system 164 are not needed.

The off-set values and the white balance of the R, G, B signals are adjusted every frame in the first signal processing circuit 151 by the CPU 160. That is, the CPU 160 outputs the off-set data, which are stored in the RAM 160A, of the respective frames and of the respective color signals to the first signal processing circuit 151, and then the off-set value of the point sequenced R, G, B signals are adjusted based on the off-set data in the first signal processing circuit 151. Similarly, the CPU 160 outputs the AWB data, which are stored in the RAM 160A, of the respective frames and of the respective color signals to the first signal processing circuit 151, and then the AWB value of the point sequenced R, G, B signals are adjusted based on the AWB data in the first signal processing circuit 151.

The image data of each frame are adjusted on the basis of the AE data, the AWB data and the like, therefore, fine image data can be taken whether the taking condition of each frame is good or not.

The adjusted image data of each frame, that is, the luminance signal Y and the chromatic signal Cr/b which are output from the second signal processing circuit 152 are stored sequentially in the CCD buffer M1 through the memory control circuit 154. The film 114 is fed at a speed eight times as fast as the feeding speed during the taking of the standard film image, therefore, the number of the picture elements of one frame in the film feeding direction is 112, as shown in FIG. 7(A). The CCD line sensor 142 has 1024 picture elements in the direction perpendicular to the film feeding direction, however, the number of the picture elements of one frame in the direction perpendicular to the film feeding direction is reduced one sixteenth to thereby be 64. The CCD buffer M1 has a capacity for storing the data of 512×10 picture elements, as shown in FIG. 7(A), therefore, the image data of 5×4×2 (40) frames can be stored. That is, the image data showing the index images for 40 frames are stored in the CCD buffer M1.

The CCD buffer M2 has a capacity for storing the data of 512×1024 picture elements, as shown in FIG. 7(B). When the image data showing the index images are stored, the number of the picture element in one frame is enlarged to 73×128 and the image data for 5×42 (20) frames can be stored. Then, the index image is displayed on the TV monitor 109, the upper left area in the display buffer M2 of 480×640 picture elements are read (see FIGS. 7(B) and (C)).

Now, in the CCD buffer M1, the image data of the respective frames are stored sequentially from the upper left to the right of the memory area in order that the image data of each frame during the scan can be read, and when the image data for 4 frames are stored, the following data are stored at the memory area of the next line from the left to the right, sequentially. Then, when the image data for 5 lines (4×5=20 frames) are stored, the following image data are stored in the next memory for twenty frames.

The contents stored in the CCD buffer M1 are transferred to the display buffer M2 while storing contents in the CCD buffer M1, therefore, when the film cartridge taken by a normal wind type camera (an ordinary camera) is set, the frame image is displayed from the left-upper portion, sequentially, as shown in FIG. 8(A).

The image data for the twenty frames are stored in the display buffer M2 at once, therefore, when the image data of the twenty-first frame are input to the CCD buffer M1, the image data are rewritten and read to the display buffer M2 which scrolls the index images upward. For example, as shown in FIG. 8(B), when the image data of the twenty-first frame are input to the CCD buffer M1, the image data for one line from the first frame to the fourth frame in the display buffer M2 are cleared, and then the image data of the twenty-first frame is written and the scan starting address while outputting the image signals is changed to the second line. With this arrangement, the index images, which are scrolled upward for one line, are displayed on the TV monitor 109. When the image data of all frames are stored in the CCD buffer M1, the screen of the TV monitor 109 is scrolled downward or changed over to display the following index images for the first twenty frames.

Now, in the CPU 160, frames are numbered in order that the respective image data are read during the scan, that is, 1, 2 . . . , and character signals showing the respective frame numbers are output to thereby display the superimposed index images, as shown FIGS. 8(A)–8(D).

On the other hand, when the film cartridge, which is taken by the pre-wind type camera, is set, and for example, there are 40 frames, as shown in FIGS. 8(C) and 8(D) the superimposed index images having 40, 39 . . . frame number are displayed from the lower-right side in the screen. Therefore, the taking order of the respective frames and the respective frame numbers are the same.

Further, at least, when a film is taken with a pre-wind type camera, data showing the pre-wind type must be recorded optically or magnetically on the film in order to display the index images in corresponding between the taking order of the respective frames and the respective frame numbers.

As stated above, the index images are prepared and displayed on the TV monitor 109, thereafter, required editing and assignments are input with the key pad 120 while monitoring the index images in order to display one frame on the TV monitor 109 with the dialogue operation (step 204).

The key pad 120, as shown in FIG. 1, consists of eight keys, keys 121–124 for an upright position, an UP key 125, a DOWN key 126, an Execute key 127 and a Cancel key.

Figures 9A, 9B:
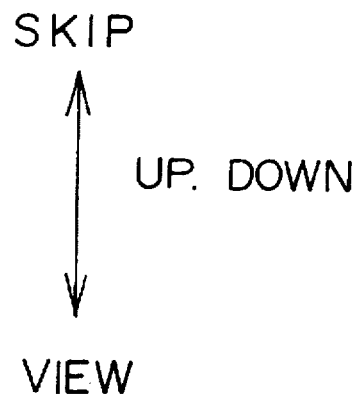
FIGS. 9(A) and 9(B) are views explaining the skip setting with index images.

Now, as shown in FIG. 9(A), the index images for twenty frames and words showing various menus for settings are displayed on the TV monitor 109 by the the CPU 160. PSET shows the number of prints to be set, ROTS shows the length and breadth of the frame to be set, SKPS shows the non-displayed frame while reproducing to be set, VIEW reproduces one frame by one frame, PLAY reproduces the respective frames at constant intervals, ENV shows an environment to be set such as an interval time and a back color, and END shows that the editing with the index images is finished.

A cursor is moved to the required menu with the UP key 125 and the DOWN key 126 of the key pad 120 (that is, the required menu is distinguished with the color), and then the Execute key 127 is pushed, whereby the menu is selected. When the menu is selected, the first frame is edited and the frame number thereof is displayed (the number is blinking). The frame to be edited is selected with the keys 121–124 on the key pad 120.

Now, as shown in FIG. 9(A), the cursor is set on the SKPS and the Execute key 127 is pushed, whereby the skip setting menu is selected.

In the skip setting menu, as shown in FIG. 9(B), the non-displayed frame is set/released with the UP key 125 or the DOWN key 126. For example, when the frame of the frame number 1 is set as a non-displayed frame, it is selected as the frame to be edited and the UP key 125 is pushed. Then, the character for the SKIP is displayed in the frame of the frame number 1. When the Execute key 127 is pushed, the memory area corresponding with the frame number 1 in the display buffer M2 is covered with the clear color and the data showing the frame number 1 of the non-displayed frame are stored in the RAM 160 the CPU 160. Further, the image data on the CCD buffer M1 is left, therefore, the DOWN key 126 is pushed and the character for the VIEW is displayed, and the the Execute key 127 is pushed, whereby the image data corresponding with the frame number 1 are transferred from the CCD buffer M1 to the display buffer M2. Thus, the frame is displayed and the data showing the frame number 1 of the non-displayed frame stored in the RAM 160A are cleared. With this arrangement, a display/non-display frame is set. The setting can be canceled with the Cancel key 128.

Next, a description is given of the direction of the length and breadth of the frame.

Figures 10A, 10B:
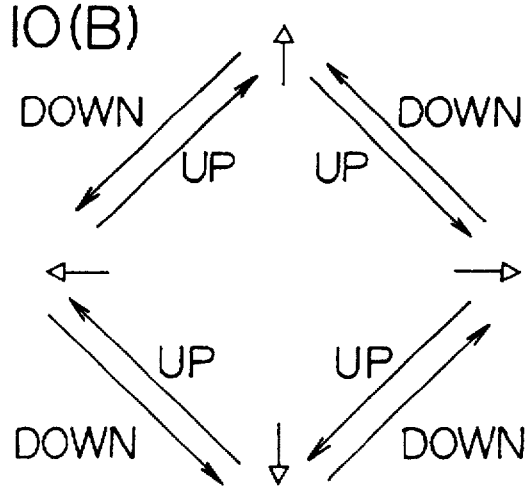
FIGS. 10(A) and 10(B) are views explaining the length and breadth setting with the index images.

As shown in FIG. 10(A), the cursor is set on the ROTS and the Execute key 127 is pushed to select the length and breadth setting menu.

When the length and breadth setting menu is selected, as shown in FIG. 10(A), the frame number of the frame to be edited blinks and an arrow indicating the upright position is displayed in the image thereof. When the UP key 125 is pushed once, as shown in FIG. 10(B), the direction of the arrow is rotated clockwise by 90°, and when the DOWN key 126 is pushed once, the direction of the arrow is rotated counterclockwise by 90°. The upright position is selected by the arrow, and then when the Execute key 127 is pushed, the image data of the frame to be edited in the memory area of the display buffer M2 are rotated in the selected direction. As shown in FIG. 7, since the number of the picture elements in the length differ from that of in the breadth, the image is reduced in the case of rotating from the breadth to the length or the image is enlarged in the case of rotating from the length to the breadth.

Next, a description is given of the number of the prints for each frame which is set.

As shown in FIG. 11, the cursor is set on the PSET and the Execute key 127 is pushed to select the print number setting menu.

When the print number setting menu is selected, as shown in FIG. 11, the frame number of the frame to be edited blinks and the number of the prints is displayed in the image thereof. Previously, zero is displayed as the number of the prints, when the UP key 125 is pushed once, one is added thereto, and when the DOWN key 126 is pushed once, one is subtracted therefrom. The number of the prints is selected, and then when the Execute key 127 is pushed, the number of the prints is set and stored in the RAM 160A of the CPU 160.

Moreover, the print format corresponding to the ratio of the length and the breadth, such as a high-vision size, a panoramic size and a normal size, can be set for every frame. In this case, the ratio of the length and the breadth in the frame of the index image is changed in accordance with the format setting, whereby the set format can be confirmed on the index image.

Further, the frame changing-over method, wherein one frame is changed over to the following frame, can be set. For example, when the display is changed from one frame to the following one, the frame changing-over method, such as a method of changing over display images instantaneously, a method of scrolling a screen, and a method of changing over in a fade-out/fade-in mode, can be specified by monitoring the index images.

The editing is finished, and then the cursor is set on the END and the Execute key 127 is pushed, whereby the editing with the index images is completed.

Figure 4:
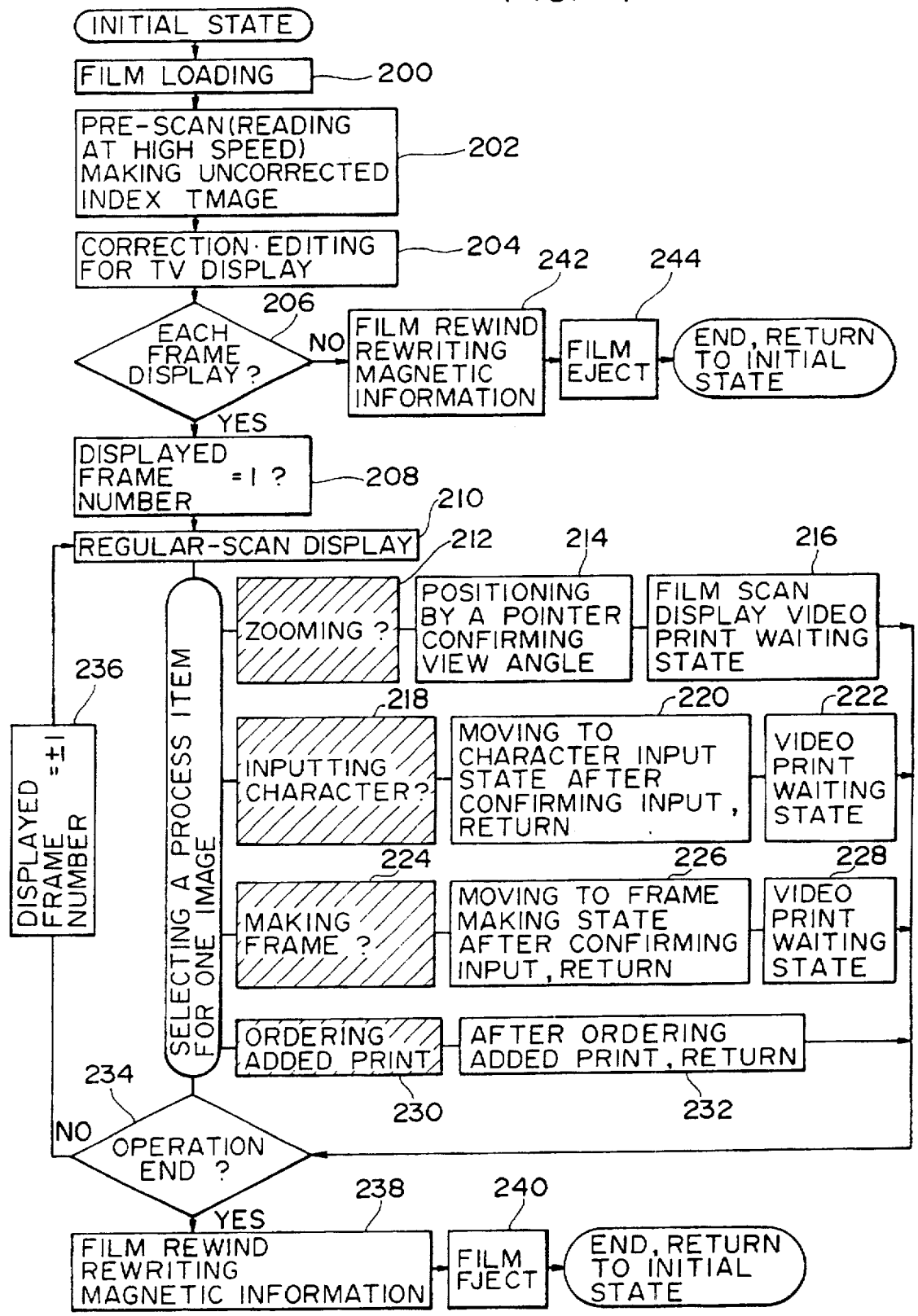
FIG. 4 is a flow chart explaining the action of the film image input system shown in FIG. 1.
Figure 5:
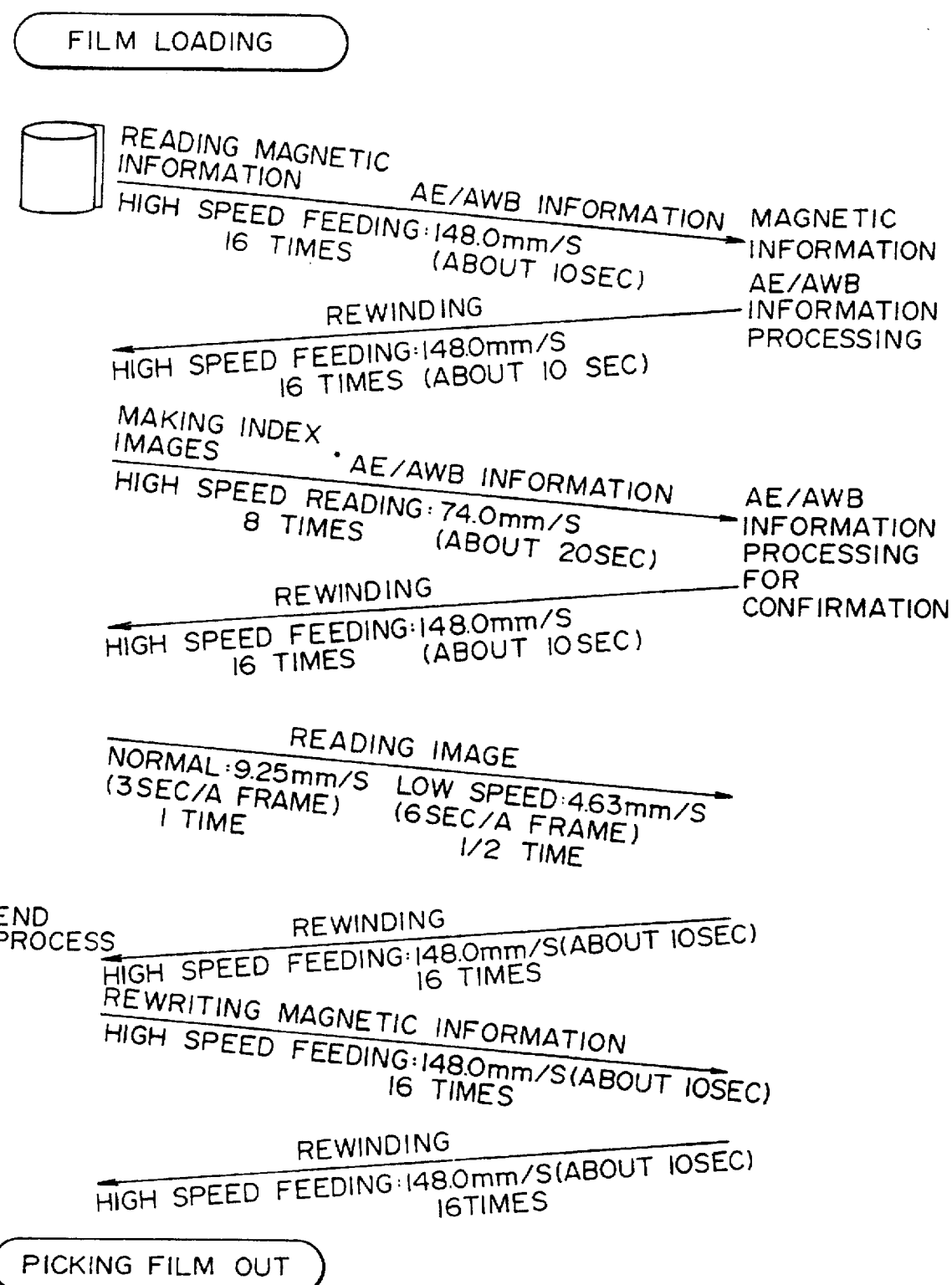
FIG. 5 is a view showing an example of the feeding sequence of the film which is fed in the film image input system shown in FIG. 1.

When the editing with the index images is completed, it is selected whether every frame is edited or not in the step 206 (FIG. 4). This selection can be done by operating the key pad 120 while monitoring the TV monitor 109.

Next, the description of every frame editing is given.

First, the display frame number is set to one (step 208), then as shown in FIG. 5, the film 114 is fed in a sequential direction at 9.25 mm/s by one frame and the frame having the frame number 1 is scanned (the regular scan) (step 210). Then, the image data are stored in the CCD buffer M1 through the CCD line sensor 142 during this regular scan.

When the image data are stored, the image data of each frame are adjusted based on the AE data, AWB data and the like which are stored in the RAM 160A by the CPU 160, therefore, fine image data can be obtained irrespective of the taking environment of each frame. Further, the number of the picture elements for one frame, which are stored in the CCD buffer M1 as mentioned above, is 512×896, as shown in FIG. 7(D). That is, the output from the CCD line sensor 142 having sensors for 1024 picture elements is thinned out to half, whereby the number of the picture elements in the direction perpendicular to the film feeding direction of one frame becomes 512, and further, the film feeding speed is reduced to one eighth of that of during the taking the image data of the index images, whereby, the number of the picture elements in the same direction of the film feeding direction for one frame of the picture images is eight times (896 picture element) as many as 112 picture elements.

Figure 12:
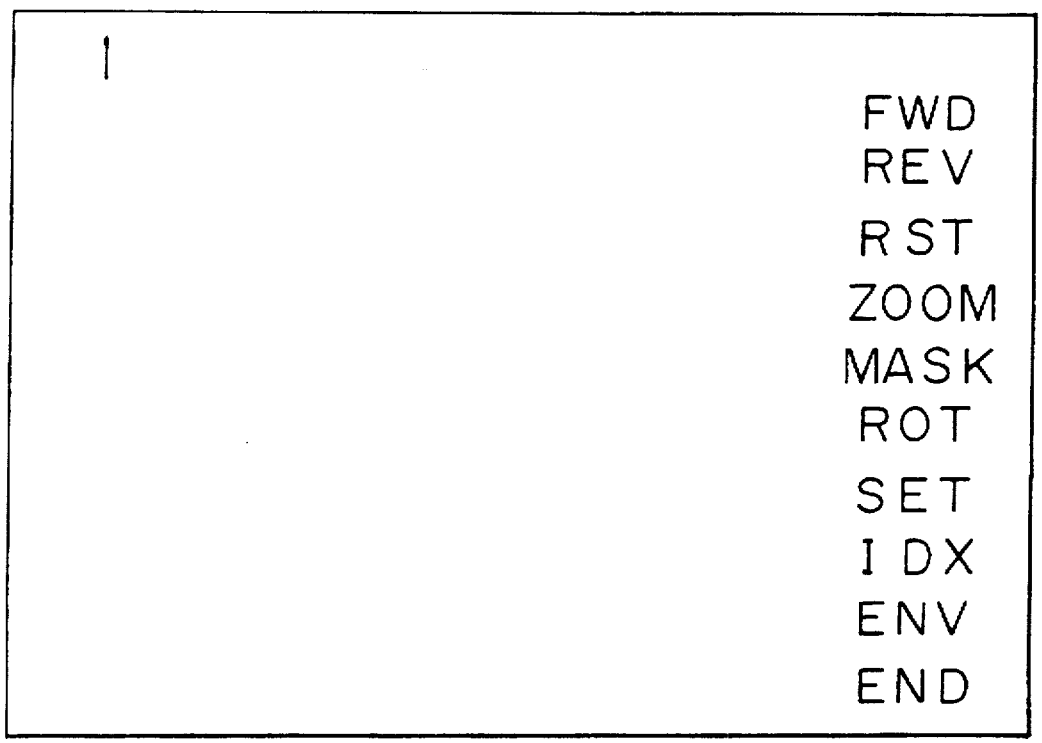
FIG. 12 is a view showing an example of the monitor picture in the setting mode of the one frame reproducing menu.

The image data, which are stored in the CCD buffer M1, are transferred to the display buffer M2, and the contents stored in the display buffer M2 are read repeatedly, whereby the image for one frame is displayed on the TV monitor 109. Further, in the setting mode of one frame reproducing menu, as shown in FIG. 12, the frame number is displayed at the upper-left and the characters showing the setting menu required for one frame editing are displayed at the right on the TV monitor 109. Further, the FWD shows the following frame reproduction, the REV shows the previous frame reproduction, the RST shows that the respective settings are reset and the re-scan is started, the ZOOM shows the zoom setting, the MASK shows the mask setting, the ROT shows the setting of the length and the breadth of the frame, the SET shows the setting for the number of the prints and the like, the IDX shows the display of the index images, the ENV shows the setting of the environment, such as the interval time and the back color, and the END shows the end of the editing with the image of one frame.

The cursor can be moved on the menu as required with the UP, DOWN keys 125, 126 of the key pad 120 and the Execute key is pushed in the same way as the editing with the index images, whereby the menu is selected.

Now, when the cursor is set on the ZOOM and the Execute key 127 is pushed, the zoom setting menu is selected (step 121). In the zoom setting menu, a pointer is moved with the keys 121–124 for the up, down, left and right directions of the key pad 120 1, whereby the zooming center is specified. Then, the UP key 125 or the DOWN key 126 is pushed to thereby zoom up or zoom out with an electric zooming. After the required zooming, the Execute 127 key is pushed, and then the zoom setting is decided and stored in the RAM 160A of the CPU 160. (step 214). Further, when the images are printed out from a video printer, not shown, which is connected to the film image input system 100, that is instructed from the printer (step 216).

Moreover, the above-mentioned electric zoom can cover the zooming range, for example, from a half to one and a half times. Then, when the magnification becomes 1.5 by the electric zoom and further the zoom up is instructed with the UP key 125, the regular scan is performed at a low speed. In this case, the film 114 is fed in the sequential direction at 4.63 mm/s (at a half speed of the normal regular scan) and the CCD output from the CCD line sensor 142 is stored based on the specified zooming center without thinning out. With this arrangement, the image data, which are zoomed twice as fast as the normal regular-scan, are stored. In the electric zoom, the maximum magnification is three times.

Further, a title, which is displayed and overlapped on the frame image, can be input with the key pad 120 (steps 218, 220) and the characteristic data showing the title are stored in the RAM 160A of the CPU 160. The cursor is moved on the MASK and the Execute key 127 is pushed, whereby an edge setting menu is selected, so that the position and the size of the edge, which is provided around the display frame, can be input with the key pad 120 (steps 224, 226). When these inputs are decided, the images can be printed out from the video printer similarly to the step 216 (steps 222, 228).

Next, a description is given of the number of the prints and the like which are set.

The cursor is moved on the SET and the Execute key 127 is pushed to select the print number setting menu (steps 230, 232).

Figures 13A, 13B, 13C:
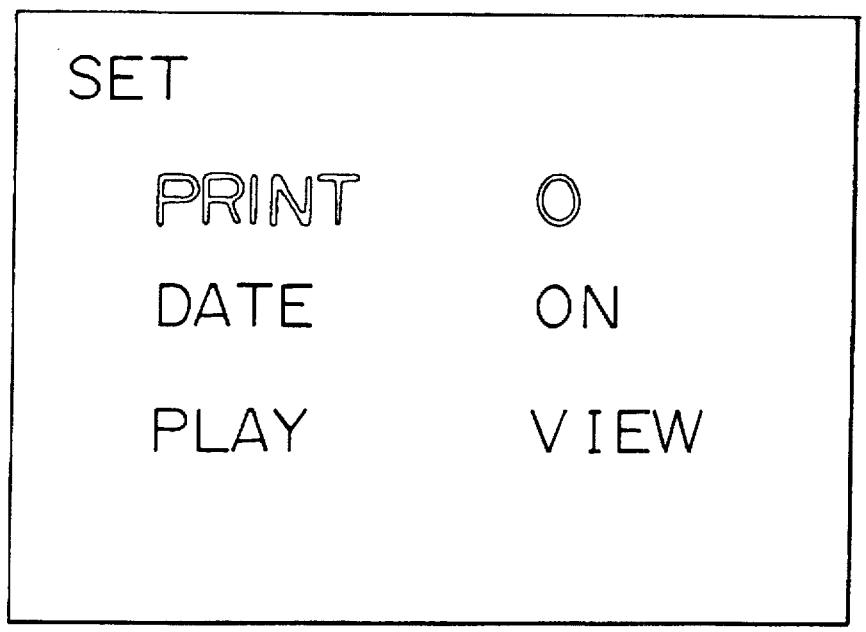
FIGS. 13(A), 13(B) and 13(C) are views explaining the setting of the print number and the like of the displayed frame.

That is, when the print number setting menu is selected, as shown in FIG. 13(A), the SET and three object items, that is, PRINT 0, DATE ON and PLAY VIEW< are displayed on the image of the frame at the upper left. These object items are selected by operating the up and down keys 121, 122, and then the selected object items are in a blinking state. When the PRINT 0 is selected, the number of the prints can be specified with the UP key 125 and the DOWN key 126, and when the DATE ON is selected, as shown in FIG. 13(B), it can be specified whether the taking date is printed or not with the UP key 125 and the DOWN key 126, and further, when the PLAY VIEW is selected, as shown in FIG. 13(C), the display/non-display (VIEW/SKIP) of the frame can be specified with the UP key 125 and the DOWN key 126. The number of the prints is specified in this way, thereafter, when the Execute key 127 is pushed, the displayed number of the prints is set and stored in the RAM 160A of the CPU 160. And, when the number of the prints, which is set with the index images, differs from the set in the one frame setting menu, for example, that set in the one frame setting menu is given priority.

Next, a description is given of the time interval time and the like of the display frame which are set.

The cursor is moved on the ENV and the Execute key 127 is pushed to select the environment setting menu.

Figure 14A:
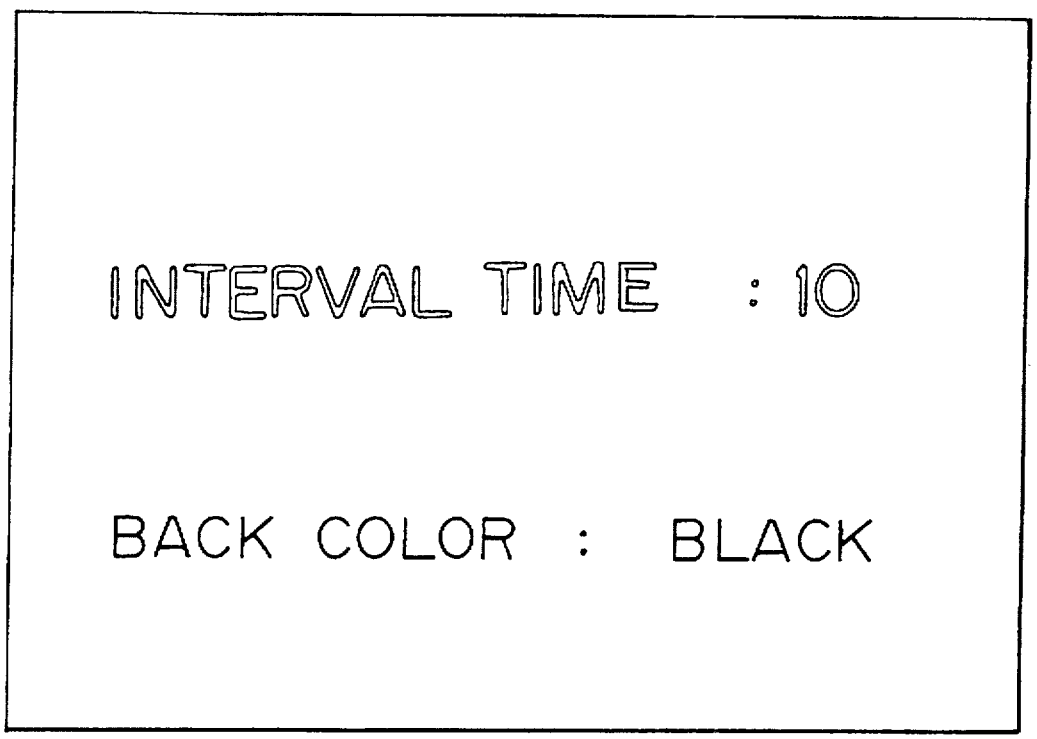
FIGS. 14(A) and 14(B) are views explaining the setting of the environment of the displayed frame.
Figure 14B:
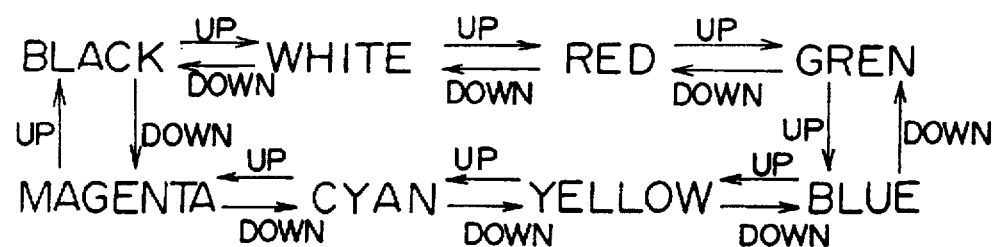

When the environment setting menu is selected, the image is muted and only character of the INTERVAL TIME:10 and BACK COLOR:BLACK are displayed, as shown in FIG. 14(A). These object items are selected with the up and down keys 121, 122 and the selected items are blinked. When the INTERVAL TIME:10 is selected, the respective display times while displaying frames continuously one by one can be specified with the UP key 125 and the DOWN key 126, and when BACK COLOR:BLACK is selected, as shown in FIG. 14(B), the back color of the display frame can be selected among eight colors with the UP key 125 and the DOWN key 126. The time interval and the like are specified in this way, thereafter, when the Execute key 127 is pushed, the displayed time interval and the like are set and stored in the RAM 160A of the CPU 160.

The display frame is edited as the above-mentioned, and then when the cursor is moved on the END and the Execute key 127 is pushed, the display frame editing is completed (step 234), and when the cursor is moved on the FWD or the REV and the Execute key 127 is pushed, 1 is added to or subtracted from the frame number (step 236) and the step is returned to 210. With this arrangement, another display frame can be edited in the same way as mentioned above.

Now, when the display frame editing is completed (step 234), as shown in FIG. 5, the film 114 is fed in the sequential direction at the high speed, 148.0 mm/s, the magnetic data which were previously read from the magnetic layer 114B in the film 114 and store in the RAM 160A of the CPU 160, the data showing the contents of the editing with the index images, the data showing the contents of the editing with the display frame and the like are stored in the magnetic layer 114B of the film 114 again (step 238). Then the film 114 is rewound in the reverse direction at the high speed, 148.0 mm/s and the film cartridge 110 is picked up (step 240).

On the other hand, in the step 206, when the editing with the display frame is not performed, the steps 242 and 244 are performed, and then the magnetic data are written in the magnetic layer 114B of the film 114 and the film cartridge 110 is picked up as same as the steps 238, 240.

Further, not shown in the flow chart of the FIG. 4, the respective frames can be reproduced in accordance with the contents edited as above on the TV monitor 109 one by one or continuously at predetermined intervals, and then therefore the film image can be enjoyed. When the film cartridge 110 which is edited once is loaded, the images can be reproduced on the TV monitor 109 in accordance with the edited contents. In this case, the magnetic data, the AE data, the AWB data and the like must be read before reproducing at least one frame. Further, the film feeding sequence in the reproducing frame is changed in accordance with whether the film taken by the normal wind type camera or by the pre-wind type camera, whereby the images can be reproduced in the taking order.

Now, in the film capable of recording magnetic and optical data, it is considered that the data of the same process are stored both magnetically and optically. The optical data, which are recorded optically during the taking, can not be rewritten. However, the magnetic data can be rewritten while editing. Thus, the case that the contents of the optical data differ from that of the magnetic data occur. For example, the data showing the high vision format are recorded optically with the camera while taking, thereafter, the data showing the panoramic format are stored magnetically in the magnetic layer while editing.

Then, the optical data and the magnetic data, which are read by the optical reading system 180 and the magnetic record reproducing system 182 respectively, are input to the CPU 160 and the both data from the same frame are compared. When it is detected that the different data for the same process are stored, the process is performed based on the contents of the magnetic data. When only the optical data are stored or errors occurr in the magnetic data, the process is formed based on the optical data. When errors occur in the magnetic data, the magnetic data can be corrected based on the optical data.

In this embodiment, the taking environment such as the brightness and a white balance is detected for every frame while taking, however, the present invention should not be limited to this. For example when plural frames having the almost same taking date are detected based on the magnetic data read from the magnetic layer in the film, the taking environment of these frames may be identified with that of the first frame. Further, the almost same taking date means that the taking dates are the same, and the taken scenes are the same or the taking times of the respective frames are immediately equal at the level that the the pictures are taken under the same environment.

Figure 6:
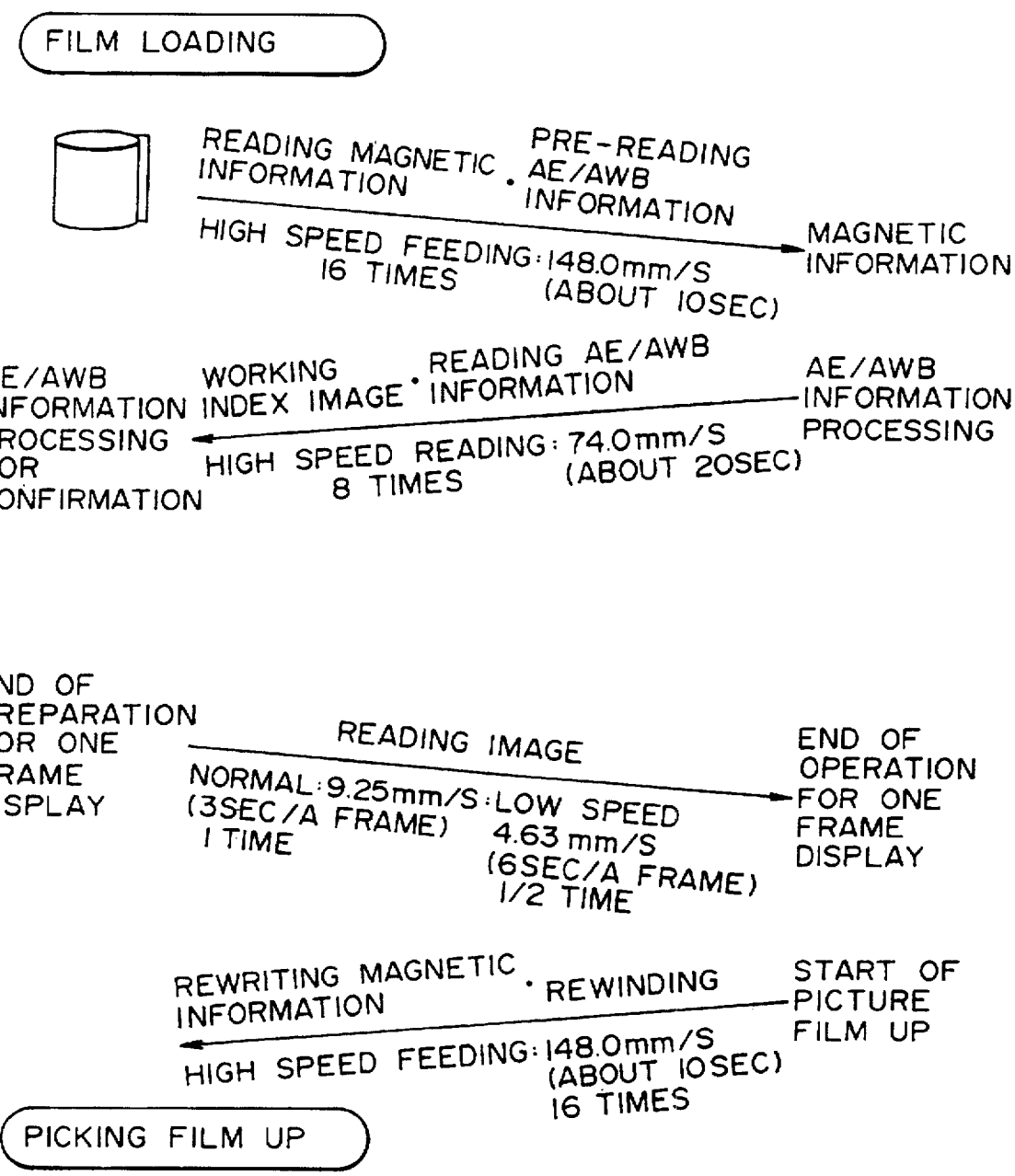
FIG. 6 is a view showing another example of the feeding sequence of the film which is fed in the film image input system shown in FIG. 1.

Further, in this embodiment, when the film is fed in the sequential direction, as shown in FIG. 5, the magnetic data are read/written and the image data are read. However, the present invention should not be limited to this, when the film is fed in the reverse direction, as shown in FIG. 6, the image data of the index images may be read, the magnetic data may be written and the like, according to this case, the time, in which the film is loaded and the respective frames are edited and the film, then the film is picked up, can be reduced. In this case, since the film feeding directions of that the magnetic data are read and written are opposite, the sending order of the magnetic data while writing must be reversed.

Moreover, in this embodiment, the image data of the index images in the film taken with the pre-wind type camera are processed as shown in FIGS. 8(C) and 8(D). However, the present invention should not be limited to this, for example, the feeding sequence of the film may be changed, and then the image data and the like may be read while rewinding (while feeding the film in the reverse direction), as shown in FIG. 5.

Next, a description is given of the upright position of the frame which is stored in the film is decided automatically.

Figure 15A:
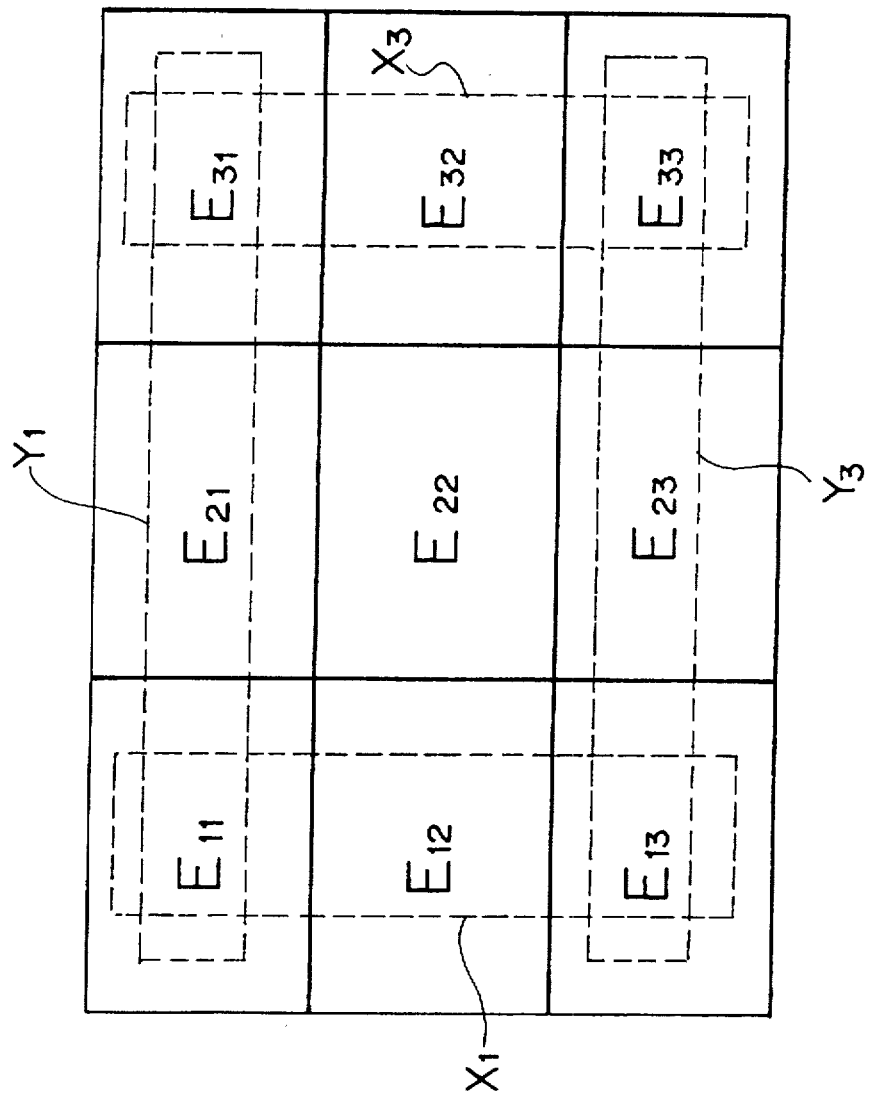
FIGS. 15(A) and 15(B) are views showing one frame divided into nine areas with the data indicating the brightness of the respective areas and a mark indicating the upright position; and, FIG. 16 is a flow chart explaining an automatic distinction of the upright position for every frame.

As mentioned above, the point-sequential R, G, B signals are input to the CPU 160 from the A/D convertor 150, and the signals are processed and the AE data and the like are detected. One frame is divided into nine areas, as shown in FIG. 15(A), based on the R, G, B signals, and the data E11–E33 showing the brightness of each area is detected and processed as shown in FIG. 16 whereby the upright position of each frame is decided automatically.

That is, as shown in FIG. 16, the data E11–E33 of each frame are read (step 300), and the data X1, X3, Y1, Y3 showing the brightness of the peripheral four sides are calculated with the following formula (step 302).

X1=E11+E12+E13
X3=E31+E32+E33
Y1=E11+E12+E13
Y3=E31+E32+E33

Figure 15B:
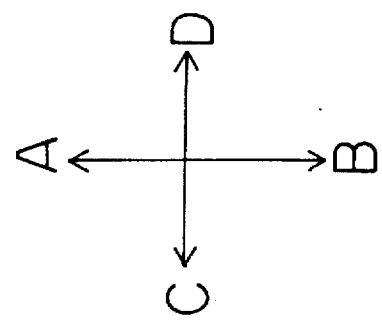

Then, four data X1, X3, Y1, Y3 are compared respectively in the steps 304–316 to thereby decide the brightest side among the peripheral four sides. Then, it is decided by the brightest side which is closest to the sky or a illumination and the image stands in the direction of the side. That is, as shown in FIG. 15(B), when the side corresponding to the data Y1 among the arrows A, B, C, D showing the upright position is brightest, the image is decided to stand in the direction of the arrow A, and when the side corresponding to the data Y3 is brightest, the image is decided to stand in the direction of the arrow B, and when the side corresponding to the data X1 is brightest, it is decided that the image stands in the direction of the arrow C, and when the side corresponding to the data X3 is brightest, it is decided that the image stands in the direction of the arrow D.

In this way, the upright position of each frame is decided automatically based on the image data of each frame, which are obtained during the pre-scan. The CPU 160 can store the data showing the decided upright position in the RAM 160A and can rotate each frame in accordance with the upright position of each frame.

And, the upright position, which are decided automatically as above, are not always right, therefore, when the frame in which the upright position is incorrectly decided, it can be corrected by the key pad 120. In the film of one film cartridge, it is hard to accept that the frame whose image stands in the direction of the arrow A shown in FIG. 15(B) and the frame whose image stands in the direction of the arrow B are mixed, therefore, in this case, the direction may be unified by one of them.

As previously described, with the film image input method and the system thereof according to the present invention, a line sensor is used as an image sensor so that the cost can be reduced, further, taking environments of all frames in one film can be detected rapidly, whereby the image data can be corrected based on the taking environment such as the brightness and the white balance for every frame, which occurs when using the line sensor. The image data of all frames in one film can be taken rapidly so that the index images can be made at a short time, thus, the image can be edited consecutively and easily while monitoring the index images. Incidentally, since the index images are not for enjoying, the quality thereof does not come into question, thus, the index images can be understood enough from the rough image data which is taken rapidly.

According to the present invention, the film is fed at a high speed during the pre-scanning and the film is fed at a low speed during the real scanning, so that the magnetic data can be recorded in the magnetic record layer of the film and can be reproduced easily, and the image data of all frames in one film can be taken rapidly, further, the fine image data for one frame can be taken during the real scanning.

Further, according to the present invention, the order of the frame number or the feeding sequence of the film is changed whether the film is taken by a pre-wind type camera or not, so that the taking order can be corresponded to the frame number usually, and the up right position of every frame is determined automatically based on the data showing the brightness in the frame, so that the direction of the frame can be displayed without correcting the direction with eyes or the correcting with eyes can be reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A film image input method comprising:
   using a film cartridge having a single spool around which developed continuous still photographic film coated with a magnetic recording layer is wound;
   transporting, forward and backward, said film between a film feed section rotating said spool of said film cartridge forward and backward and a film windup section driving a windup axis around which said film is wound;
   providing a line sensor in which photoelectric elements are arranged in a direction perpendicular to a transport direction of said film;
   taking rough image data of all frames through said line sensor by transporting said film continuously at a first speed, and taking magnetic data from said magnetic recording layer on said film via a magnetic head while said film is transported continuously at said first speed;
   detecting taking environment of each frame individually based on said rough image data which are taken;
   thereafter, adjusting fine image data of a desired frame based on said taking environment of the frame which is detected and taking them through said line sensor by transporting said film at a second speed which is lower than the first speed while reproducing one frame; and
   displaying frame images on a display based upon said taken fine image data and said read magnetic data.

2. A film image input method as set forth in claim 1, wherein said taking environment is a brightness of a frame picked up in said film and an exposure to the line sensor is adjusted based on the brightness of each frame in taking the fine image data of the desired frame.

3. A film image input method as set forth in claim 1, wherein said taking environment is a white balance condition of a frame picked up in said film and a white balance is adjusted based on the white balance of each frame in taking the fine image data of the desired frame.

4. A film image input method as set forth in claim 1, wherein index images for n×m frames are prepared based on said rough image data of all frames and displayed on said display.

5. A film image input method as set forth in claim 1, wherein after detecting said taking environment, the rough image data of all frames which are adjusted based on the taking environment for every frame detected through said line sensor are taken by transporting the film again continuously at the speed which is higher than the second speed, index images of n×m frames are prepared based on the rough image data, and then the image data are displayed on said display.

6. A film image input method as set forth in claim 4 or 5, wherein when a number of the frames is more than n×m, the n×m frames are scrolled up or down, or to the right or to the left whereby to display all frames.

7. A film image input method as set forth in claim 5, wherein said magnetic data and said taking environment are taken while said film is fed from said film cartridge to said film windup section, and said rough image data of all frames for creating said index images is taken while said film is rewound from said film windup section to said film cartridge.

8. A film image input method as set forth in claim 5, wherein a film transport speed at the time when said rough image data of all frames for creating said index images is lower than said first speed at the time when said magnetic data and said taking environment are captured.

9. A film image input method as set forth in claim 5, wherein said taking environment for every frame is detected again based on said rough image data of all frames for creating said index images.

10. A film image input method as set forth in claim 1, wherein said magnetic data shows at least one of a frame number, a format corresponding to a ratio of a length and a breadth of an image, a number of prints, a taking environment, a title, and a taking data/time.

11. A film image input method as set forth in claim 10, further comprising coinciding taking environments of plural frames when plural frames of which photographing dates are almost or identically the same based on the magnetic data read from the magnetic record layer.

12. In a film image input system for displaying images of a long roll of developed film for a still camera on a display, the film image input system comprising:
   a film cartridge having a single spool around which said long roll of developed film for the still camera is wound, the film being coated with a magnetic record layer;
   film transport means having a film feed section for rotating said spool of said film cartridge forward and backward and a film windup section for driving a windup axis around which the film is wound, and transporting, forward and backward, said film between said film feed section and said film windup section;
   illumination means for illuminating the film located between said film feed section and said film windup section;
   a line sensor in which photoelectric transfer elements are arranged in a direction perpendicular to a transport direction;
   a taking lens for focusing images of the film which are illuminated by the illumination means on the line sensor;

magnetic data reading means, having a magnetic head abutted on said magnetic record layer on said film, for reading magnetic data from said magnetic record layer on said film via said magnetic head;

an image memory for storing image data, which is input through the line sensor, for at least one frame;

display controlling means for displaying frame images on said display based on the image data stored in the image memory;

control means for controlling the line sensor, the magnetic data reading means, the film transport means and the image memory, wherein said control means controls film transport speed with said film transport means in a manner that said film is transported at a first speed when the rough image data of all frames on the film are captured through said line sensor, magnetic data is captured from the magnetic record layer by said magnetic data reading means when said film is transported at said first speed, and said film is transported at a second speed which is lower than said first speed when fine image data are stored in said image memory through said line sensor.

13. A film image input method as set forth in claim 12, wherein said control means transports said film continuously and stores rough image data of all frames in said film in said image memory while transporting said film at said first speed, and stores fine image data of one frame in said image memory while transporting said film at said second speed.

14. A film image input method as set forth in claim 13, wherein said control means includes a memory which stores said taking environment for every frame, detected by said detecting means.

15. A film image input method as set forth in claim 14, wherein said control means adjusts at least one of an exposure control means and a white balance adjustment means in accordance with the taking environment of every frame, which is stored in said memory means, while taking the image data of one frame at the second speed.

16. A film image input method as set forth in claim 13, wherein said display controlling means controls that image signal showing of all frames are output on the display based on the rough image data stored in the image memory.

* * * * *

UNITED STATES PATENT AND TRADEMARK OFFICE
CERTIFICATE OF CORRECTION

PATENT NO. : 5,754,221
DATED : May 19, 1998
INVENTOR(S) : Toru NISHIMURA and Atsushi ITOH It is certified that error appears in the above-identified patent and that said Letters Patent is hereby corrected as shown below:

On title page, item [30]
Change the priority date from "December 23, 1993" to --December 24, 1993--.

Signed and Sealed this

Eighth Day of September, 1998

Attest:

BRUCE LEHMAN

*Attesting Officer*   *Commissioner of Patents and Trademarks*